United States Patent [19]
Martins

[11] 3,771,625
[45] Nov. 13, 1973

[54] DISC BRAKE CALIPER MOVEMENT CONTROL

[75] Inventor: Samuel J. Martins, Los Angeles, Calif.

[73] Assignee: Airheart Products, Inc., Van Nuys, Calif.

[22] Filed: Oct. 13, 1971

[21] Appl. No.: 188,768

Related U.S. Application Data

[63] Continuation of Ser. No. 882,976, Dec. 8, 1969, abandoned.

[52] U.S. Cl. ........... 188/71.8, 188/72.3, 188/196 P, 188/216
[51] Int. Cl. ............................................. F16d 65/64
[58] Field of Search ............... 188/71.8, 72.3, 216, 188/196 P

[56] References Cited
UNITED STATES PATENTS

| | | | |
|---|---|---|---|
| 2,531,341 | 11/1950 | Meador, Jr. | 188/71.8 |
| 2,657,772 | 11/1953 | Chamberlain | 188/71.8 |
| 3,199,635 | 8/1965 | Bessler et al. | 188/196 P |
| 3,292,739 | 12/1966 | Ulbing | 188/71.9 |

*Primary Examiner*—George E. A. Halvosa
*Attorney*—William W. Haefliger

[57] ABSTRACT

A disc brake caliper carries at least one braking element to face the disc side, and the caliper is mounted to shift in one direction relative to the disc in order to bring that element into braking engagement with one side of the disc in response to actuating force exertion on the caliper; and retractor means is provided to yieldably resist such shifting of the caliper and to displace the latter in the opposite direction to carry the braking element out of braking engagement with the disc in response to reduction of actuating force exertion. The caliper may be mounted on a shaft to compress a spring in response to caliper shifting; spring compression force may be transmitted to the shaft via a part frictionally gripping the shaft; and that part may be shiftable along the shaft only in response to exertion of force substantially greater than that required to fully compress the spring, thereby to compensate for brake element wear.

4 Claims, 5 Drawing Figures

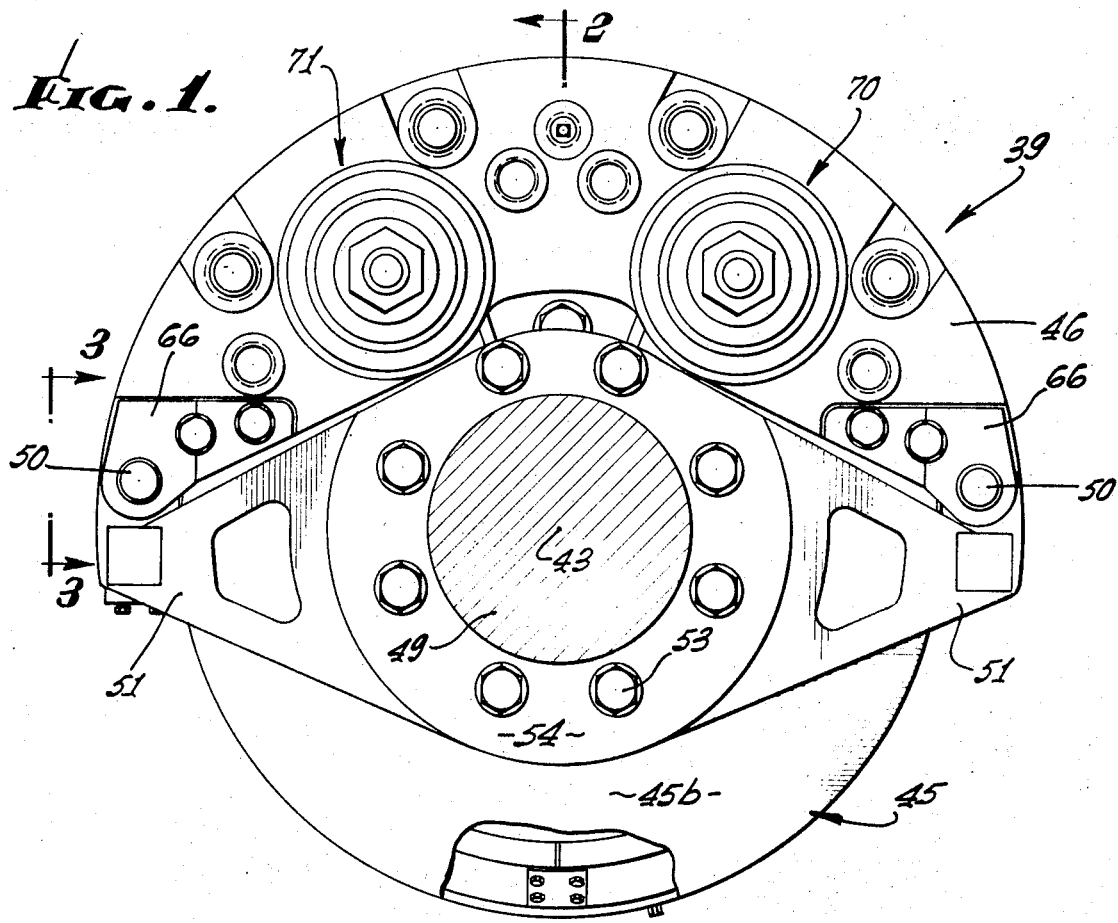
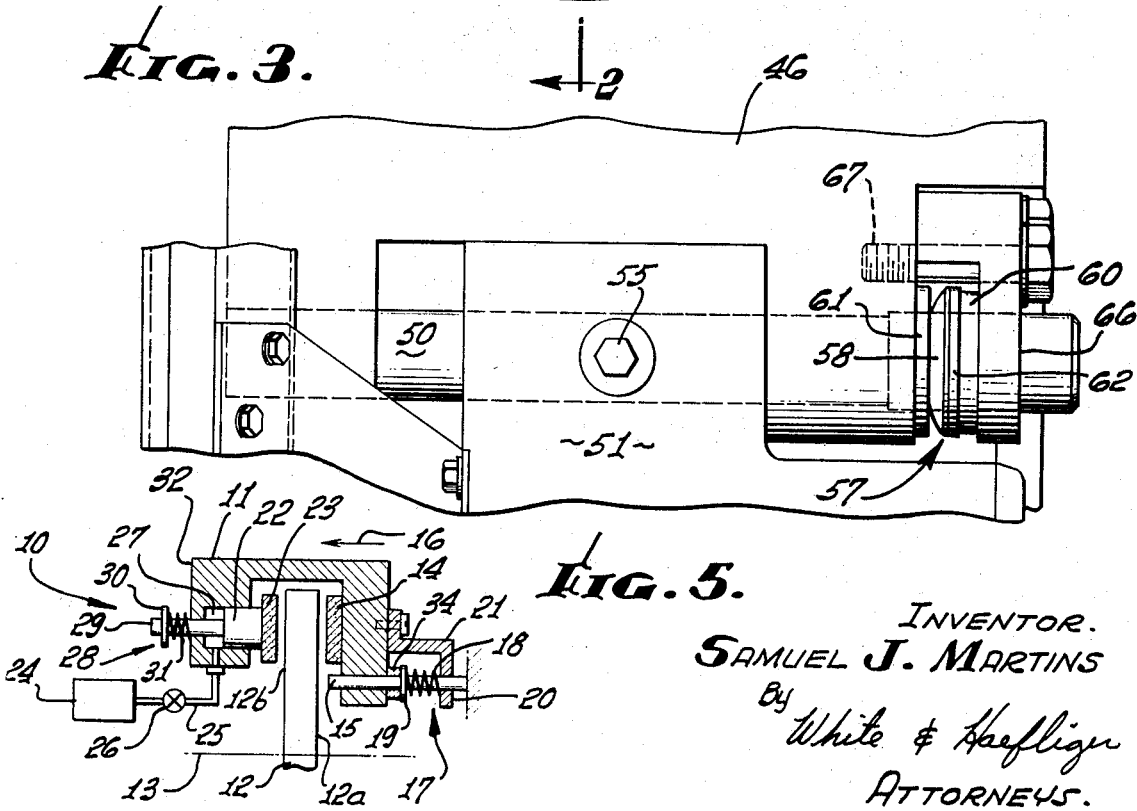

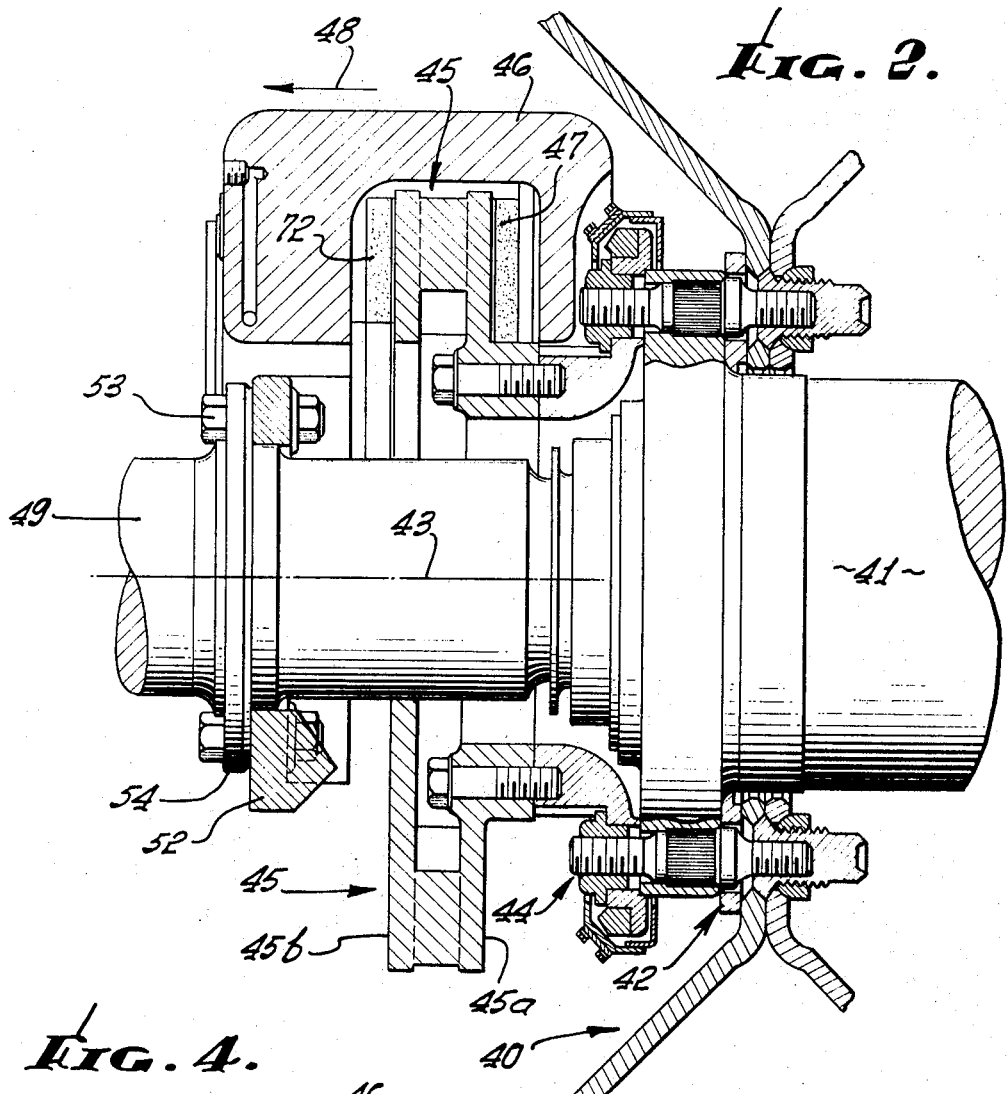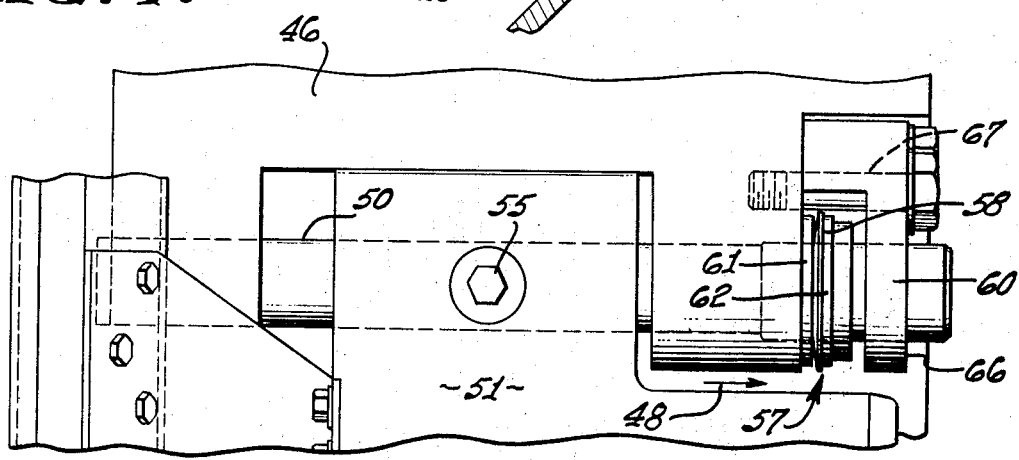

//3,771,625//

DISC BRAKE CALIPER MOVEMENT CONTROL

This is a continuation of U.S. Pat. application Ser. No. 882,976, filed Dec. 8, 1969, now abandoned.

BACKGROUND OF THE INVENTION

This invention relates generally to disc brakes, and more specifically concerns the elimination of problems having to do with undesired wear of such brakes on vehicles.

Vehicle disc brake wear may occur when the brakes are not actuated due to the fact that one or both brake pads may come into inadvertent engagement with the rotating disc. Such wear is undesirable as it requires more frequent replacement of the brake pads. While it is possible to positively retract the pads from the disc, floating calipers on which the pads are usually carried tend to slide back and forth due to inertial forces as the vehicle turns corners while the brakes are not actuated, with the result that the pads come into engagement with the disc and undesired wear results. This problem is commonly referred to as "knock-back."

SUMMARY OF THE INVENTION

Major objects of the present invention are to eliminate the problems referred to above, and also to provide disc brake structure of unusually advantageous construction and mode of operation, featuring anti knock-back in a floating caliper brake unit. Means is provided to controllably shift the caliper and retain it in a position such that the brake pads remain spaced from the disc when the brakes are not actuated, despite inertial loading on the caliper, and brake wear compensation is effected during brake actuation.

Basically, the invention is embodied in the combination that comprises a caliper adapted to straddle the rotary disc, the caliper carrying at least one braking element to face the disc side; means mounting the caliper to shift in one direction relative to the disc in order to bring that element into braking engagement with one side of the disc in response to actuating force exertion on the caliper; and retractor means carried to yieldably resist such shifting of the caliper and to displace the caliper in the opposite direction to carry that element out of braking engagement with the disc in response to reduction of actuating force exertion. Accordingly, the resistance to caliper shifting, as described, after the pad is retracted from the disc, prevents such wear as referred to.

As will be seen, unusual advantages result from the provision of mounting means in the form of a pair of parallel shafts extending in the direction of caliper shifting and outwardly of the disc periphery at opposite sides of the disc axis of rotation; retractor means in the form of a pair of compression springs operatively connected between the shafts and caliper to be compressed in response to caliper shifting, there being parts such as drag rings frictionally gripping the shafts and located to transmit to the shafts forces developed by spring compression. Each of such drag rings is shiftable along its associated shaft only in response to exertion thereon of force substantially in excess of that required to compress the spring, thereby to compensate for brake pad wear. Such adjustment occurs while the brakes are in use, i.e., energized.

A further object of the invention concerns the provision of controlled retraction of pads at both sides of the disc, so that none of such pads will inadvertently engage the disc, as will be seen.

These and other objects and advantages of the invention, as well as the details of illustrative embodiments, will be more fully understood from description and drawings, in which:

DRAWING DESCRIPTION

FIG. 1 is an end elevation showing disc brake structure incorporating one preferred form of the invention;

FIG. 2 is an elevation taken in section on lines 2—2 of FIG. 1;

FIG. 3 is an enlarged elevation taken on line 3—3 of FIG. 1;

FIG. 4 is a view like FIG. 3; and

FIG. 5 is a schematic showing operating principles of the invention.

DESCRIPTION OF PREFERRED EMBODIMENT

Referring first to FIG. 5, the illustrated disc brake assembly 10 includes a caliper 11 adapted to straddle the rotary disc 12 during disc rotation relative to the caliper and about axis 13; a braking element (as for example pad 14) carried by the caliper to face one side of the disc; means (as for example fixed shaft 15) mounting the caliper to shift in one direction (see arrow 16) in order to bring the braking element into braking engagement with one side face 12a of the disc in response to actuating force exertion on the caliper; and retractor means generally indicated at 17 carried to resist such shifting of the caliper and to displace the caliper in the opposite direction to carry the braking element out of engagement with the disc in response to reduction of actuating force exertion. In this regard, the retractor means 17 includes a compression spring 18 operatively connected between shaft 15 and the caliper to be compressed in response to caliper shifting in the direction of arrow 16. Note that spring 18 is held endwise between a part (as for example washer 19) on the shaft, and a shoulder 20 integral with the caliper, as for example via bracket 21.

Also shown in FIG. 5 is an actuator, as for example piston 22, carried by the caliper and another braking element, as for example pad 23, carried to be operable by the actuator to engage the opposite side 12b of the disc, whereby the actuator then exerts the previously mentioned actuating force on the caliper. For example, when fluid pressure from source 24 is transmitted via line 25 and valve 26 to the cylinder 27, the piston 22 is urged to the right to engage pad 23 with the disc 12. Reaction force transmitted by the fluid pressure on the caliper urges the latter to the left until pad 14 engages the disc 12, so that both pads then frictionally grip opposite sides of the disc with braking effect. Such shifting of the caliper results in compression of spring 18. Upon release of pressure application, the caliper 12 and pad 14 automatically retract a predetermined distance $d_1$ to the right in response to expansion of spring 18, whereby the pad 14 is held out of engagement with the disc until such time as the brake is again actuated. Also, the pad 23 is automatically retracted a predetermined distance $d_1$ plus $d_2$ to left, as by means of retractor mechanism 28, to compensate for the rightward movement $d_1$ of the caliper and to carry the pad 23 out of engagement with the disc until such time as the brake is again actuated. Retractor mechanism 28 may be similar to that shown at 17, and includes a shaft 29 integral with piston 22, a washer 30 on the shaft, and a compression spring 31 retained between the washer and the face 32 of the caliper. Accordingly, when fluid pressure exerted on piston 22 is relieved, the elements shift to positions such as seen in FIG. 5, with pads 23 and 14 held out of engagement with disc 12 despite incidental inertial loading as may occur upon turning of the vehicle, etc. Part 34 blocks rightward caliper movement.

Referring now to FIGS. 1–4, the illustrated brake assembly 39 includes elements functioning in the manner as described in connection with FIG. 5, as well as additional unusually advantageous elements and modes of operation. Vehicle wheel structure 40 is shown mounted on a shaft 41, as by attachment structure 42. Shaft 41 turns about axis 43, and attachment structure 44 connects a braking disc 45 to the shaft.

The assembly 39 includes a caliper 46 straddling the disc 45 having opposite sides or faces 45a and 45b; braking element or pad 47 carried by the caliper to force one side 45a of the disc; means squaring the caliper to shift in one direction into arrow 45b in order to bring braking element 47 into braking engagement with disc side face 45a in response to actuating force exertion on the caliper; and retracted means carried to resist such shifting of the caliper and to displace the latter in the opposite direction to carry the pad 47 out of disc engagement in response to reduction of actuating force exertion. In this regard, the mounting means includes a pair of parallel shafts 50 extending outwardly of the disc periphery and at locations at opposite sides of axis 43 and nonrotary axle 49. Thus, the shafts may be spaced about the axis 43 at any included angle. The shafts are integral with oppositely extending torque arms 51 projecting from a hub 52 bolted at 53 to the axle flange 54. FIG. 4 shows that pins 55 connect the torque arms to the shafts 50.

The caliper body may advantageously be recessed at locations 56 to receive the retractor means previously referred to and associated with each of the shafts 50. Each retractor, generally indicated at 57, includes a compression spring such as Belleville washer 58 operatively connected between the shaft 50 and caliper 46 to be compressed in response to caliper shifting in direction 48, as seen in FIG. 4. A part, as for example drag ring 60, frictionally grips the shaft 50 and transmits to the shaft force developed by spring compression. The Belleville spring is retained between washers 61 and 62, the former transmitting loading from the caliper to the spring, and the latter transmitting loading from the spring to the drag ring. Although the ring tightly grips the shaft, it is capable of being shiftable along the shaft only in response to force substantially greater than that required to fully compress the spring, thereby to compensate for brake pad wear. For example, as the pad 47 wears, caliper 46 will be shifted further to the left in FIG. 2 in response to brake actuation, and this increased shifting will result in compensatory shifting of the drag ring to the right in FIG. 4, and along shaft 50; however, the retracting functioning of spring 58 will not thereby be unduly disturbed despite the fact that the force to shift the drag ring is transmitted via the spring. Finally, a housing part 66 is attached to the caliper body 16 as by fastener 67 so as to enclose the retractor structure in recess 56, reducing risk of inadvertent damaging, and also limiting caliper movement to the left in FIG. 3. Shafts 50 may project through the parts 66, as seen in FIG. 1.

By locating the fixed shafts 50 at opposite sides of axis 43, the C-shaped caliper body 46 is enabled to be supported by the shafts and torque arms in a balanced condition. This further facilitates the use of two actuators generally indicated as housed at 70 and 71 in the caliper body 46. Such actuators may comprise pistons mounting brake pads and corresponding to those described at 22 and 23 in FIG. 5. FIG. 1 shows such pads at 72. Suitable retractors may be associated with such actuators, also as described at 28 in FIG. 5.

I claim:

1. In a disc brake assembly defining an axis of disc rotation, the combination comprising
   a. a caliper adapted to straddle the disc during disc rotation relative to the caliper,
   b. a first braking element carried by the caliper to face one side of the disc,
   c. non-rotary torque arm structure and a shaft carried by and affixed to said structure extending in the direction of said axis and mounting the caliper to shift bodily therealong,
   d. actuator means carried on the caliper, and a second braking element carried to be operable in response to actuating force transmission to engage the opposite side of the disc, thereby to shift the caliper in order to bring the first element into engagement with said one side of the disc, the actuator means having axially movable plunger structure,
   e. a Belleville spring washer carried on the shaft to be compressed in response to caliper shifting in one direction lengthwise of the shaft,
   f. a drag ring carried on and frictionally gripping the shaft for transmitting to the shaft force developed by spring washer compression while remaining capable of being shifted along the shaft in said direction only in response to caliper transmitted force substantially exceeding that force required to fully compress the Belleville spring washer, thereby to compensate for braking element wear, and
   g. a housing part removably attached to the caliper at one side thereof and retained within a cutout in the caliper to define therewith a recess within which the Belleville spring washer and drag ring are housed to reduce risk of inadvertent damage thereto, the housing part defining a bore receiving the shaft so that said part is movable relative to the shaft toward and away from the drag ring at the side thereof opposite the Belleville spring washer.

2. The combination of claim 1 including a second shaft carried by said torque arm structure, a second Belleville spring and drag ring carried on the second shaft, and a second housing part defining with the caliper a second recess like the first mentioned recess, and wherein the shafts are located generally diametrically oppositely of said axis.

3. The combination of claim 1 including force transmitting washers on the shaft at opposite sides of the Belleville spring washer.

4. The combination of claim 2 wherein said actuator means includes two groups of cylinder and piston members each defining chamber structure to receive actuating fluid pressure to advance the piston member axially, the second braking member carried by the piston member, said groups being offset angularly about said axis.

* * * * *